Figure 1:
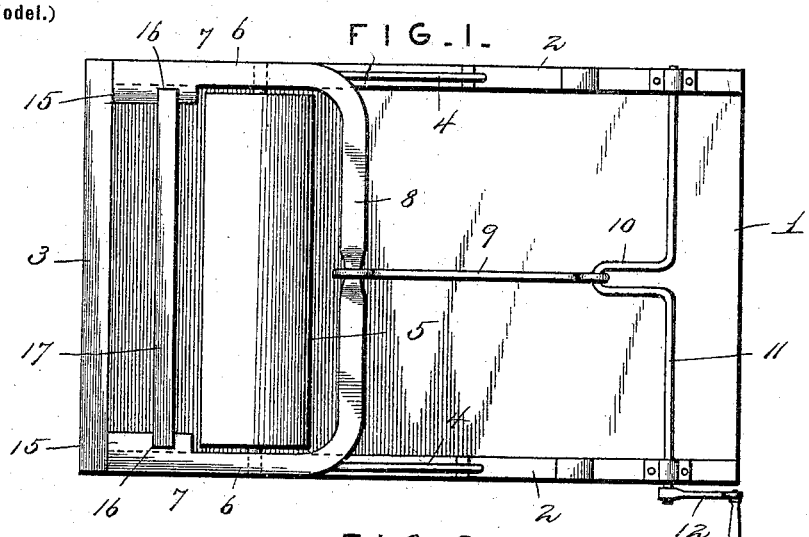

No. 622,491. Patented Apr. 4, 1899.
J. T. KILLIN.
BUTTER WORKER.
(Application filed May 7, 1898.)
(No Model.)

Witnesses
Harry L. Ames
L. M. Walker

Inventor
Joel T. Killin.
by V. D. Stockbridge
his Attorney.

UNITED STATES PATENT OFFICE.

JOEL T. KILLIN, OF GREENVILLE, OREGON.

BUTTER-WORKER.

SPECIFICATION forming part of Letters Patent No. 622,491, dated April 4, 1899.

Application filed May 7, 1898. Serial No. 680,018. (No model.)

*To all whom it may concern:*

Be it known that I, JOEL T. KILLIN, a citizen of the United States, residing at Greenville, in the county of Washington and State of Oregon, have invented certain new and useful Improvements in Butter-Workers; and I do hereby declare the following to be a full, clear, and exact description of the invention, such as will enable others skilled in the art to which it appertains to make and use the same.

This invention relates to butter-workers; and the principal object of the invention is to provide a machine for working butter which is adapted to be quickly and readily converted into a press for forcing the butter, after it has been worked, into a suitable mold or molds, thus enabling one machine to perform the work which has hitherto required the employment of two separate machines.

The detailed objects and advantages of the invention will be carefully pointed out in the course of the ensuing description.

The invention consists in a butter worker and press embodying certain novel features and details of construction and arrangement of parts, as hereinafter fully described, illustrated in the drawings, and incorporated in the claims.

Figure 2:
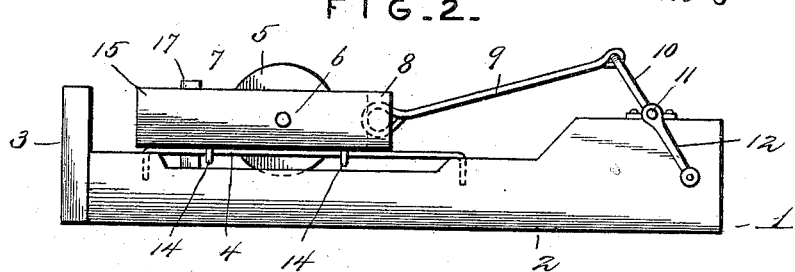
Figure 3:
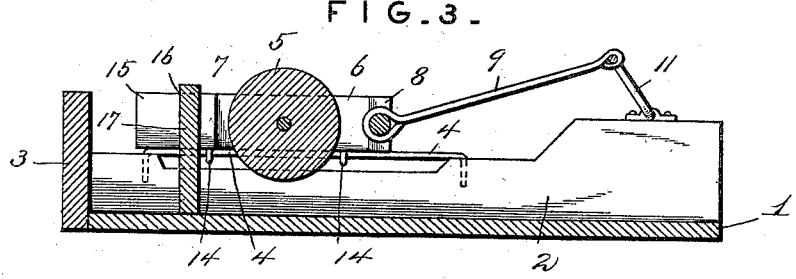
Figure 4:
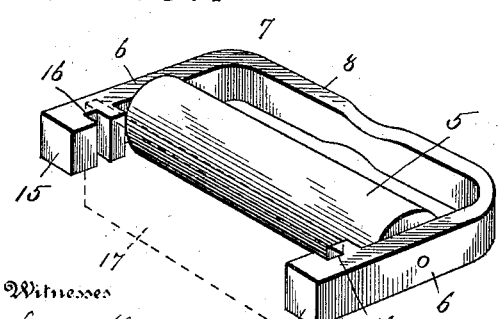
Figure 5:
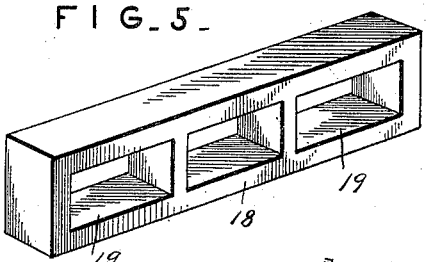

In the accompanying drawings, Figure 1 is a plan view of a butter-worker constructed in accordance with this invention. Fig. 2 is a side edge elevation thereof. Fig. 3 is a longitudinal section taken centrally through the butter-worker. Fig. 4 is a detail perspective view of the roller-frame with the follower or compression-board detached. Fig. 5 shows in perspective the mold.

Similar numerals of reference designate corresponding parts in all the views.

The combined butter worker and press or mold contemplated in this invention comprises a suitable receptacle or tray consisting of a bottom 1, sides 2, and an end 3, the sides and end extending upwardly above the upper surface of the bottom 1 and forming means to retain the butter in place on the board or bottom 1. Extending along the upper edges of the sides 2 are guides 4 in the form of rods, having their opposite ends bent downward and secured fixedly in the sides 2.

For the purpose of working the butter and expressing the liquid therefrom I employ a roller 5, adapted to be moved longitudinally over the upper surface of the bottom 1, and this roller has its shaft journaled in the side or terminal portions 6 of a bail-shaped frame or carriage 7, the connecting portion 8 of which is arranged in rear of the roller 5 and has connected thereto one end of a rod or pitman 9, the opposite end of which is operatively connected to the crank 10 of a crank-shaft 11, journaled in bearings on the sides 2 and provided at one end with a crank-handle 12, by means of which it may be turned for imparting a reciprocatory movement to the frame or carriage 7.

The terminal portions 6 of the frame or carriage 7 are provided at suitable points with eyes 14, which encircle and slide upon the rods or guides 4 for the purpose of guiding the frame or carriage in a rectilinear path and longitudinally of the tray. The extremities of the terminals 6 are extended beyond the roller 5 and have inwardly-extending lugs 15, forming between them vertical grooves or ways 16, in which are received the opposite ends and edges of a follower or compression-board 17, the ends of said board fitting tightly in their seats and being held by frictional engagement only, although, if desired, suitable binding screws or fasteners may be employed to more effectually retain the board 17 in place. The length of the board 17 is equal to the distance between the sides 2, and it abuts against the inner surfaces thereof and serves to steady and guide the frame or carriage 7 in its movements, thereby assisting the eyes which embrace the guides 4 in preventing the carriage or frame from twisting and binding in its reciprocatory movements.

The end 3 is somewhat higher than the sides 2 and is designed to form a backing for a suitable mold 18, which is removably fitted between the sides 2 and provided with one or more compartments 19, into which the butter may be pressed after it has been thoroughly worked.

In the operation of the butter-worker as such the follower or compression-board 17 is removed and the roller reciprocated upon the material until the liquid is expressed therefrom. After the butter has been properly worked and is ready to be molded the follower or compression-board 17 is inserted in the grooves of the carriage or frame 7 and the mold 18 also placed in position against the end 3 of the tray, whereupon by giving a partial turn to the crank-shaft the follower 17 is moved toward the mold and the butter in advance of the follower is pressed firmly into the compartments of the mold. This operation may be repeated until all the butter has been molded, after which the board 17 may be removed and an additional supply of butter worked, as previously explained.

Having thus described the invention, what is claimed as new, and desired to be secured by Letters Patent, is—

1. In a butter-worker, the combination with a tray or receptacle, of guides thereon, a reciprocating frame engaging said guides, means for reciprocating said frame, a roller journaled in the frame, and a compression-board removably mounted in said frame, substantially as described.

2. In a butter-worker, the combination with a tray or receptacle having upwardly-extending sides and an end, of guide-rods extending longitudinally of the sides, a reciprocating bail-shaped frame having eyes embracing said guides, means for reciprocating said frame, a roller journaled in the frame, and a follower or compression-board removably mounted in said frame, substantially as described.

3. In a butter-worker, the combination with a tray or receptacle having longitudinal guide-rods, of a bail-shaped frame having eyes engaging said guide-rods, means for reciprocating said frame, a roller journaled in the frame, inwardly-extending lugs on the terminal portions of the frame, and a follower or compression-board having its ends removably fitted between said lugs, substantially as described.

4. In a butter-worker, in combination, a rectangular tray or receptacle, a reciprocating bail-shaped frame having eyes on its terminal portions slidingly engaging longitudinal guides on the tray, means for reciprocating said frame, a roller journaled in the frame, a follower or compression-board having its ends removably fitted in grooves in the inner surfaces of the terminal portions of the frame, and a removable mold inserted between the end wall of the tray and the compression-board, all arranged for joint operation substantially as described.

In testimony whereof I affix my signature in presence of two witnesses.

JOEL T. KILLIN.

Witnesses:
  J. C. MOORE,
  WILLIS IRELAND.